May 19, 1970  N. M. NORMAN ET AL  3,512,830
SAFETY BELTS
Filed April 11, 1967  4 Sheets-Sheet 1
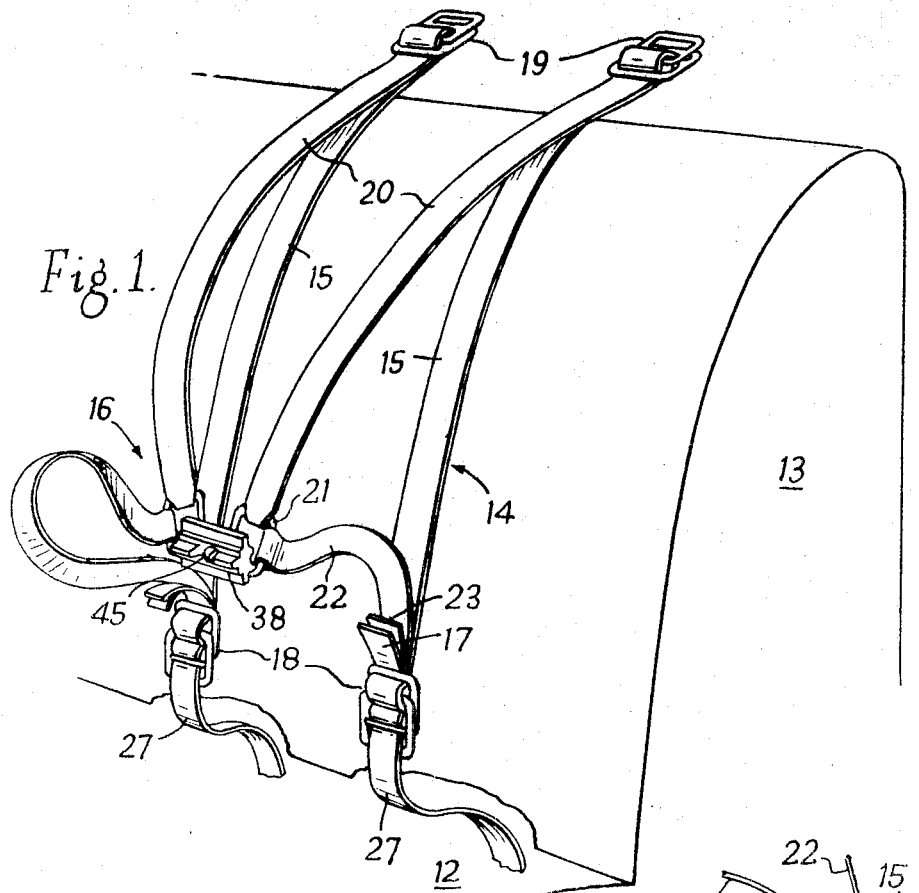
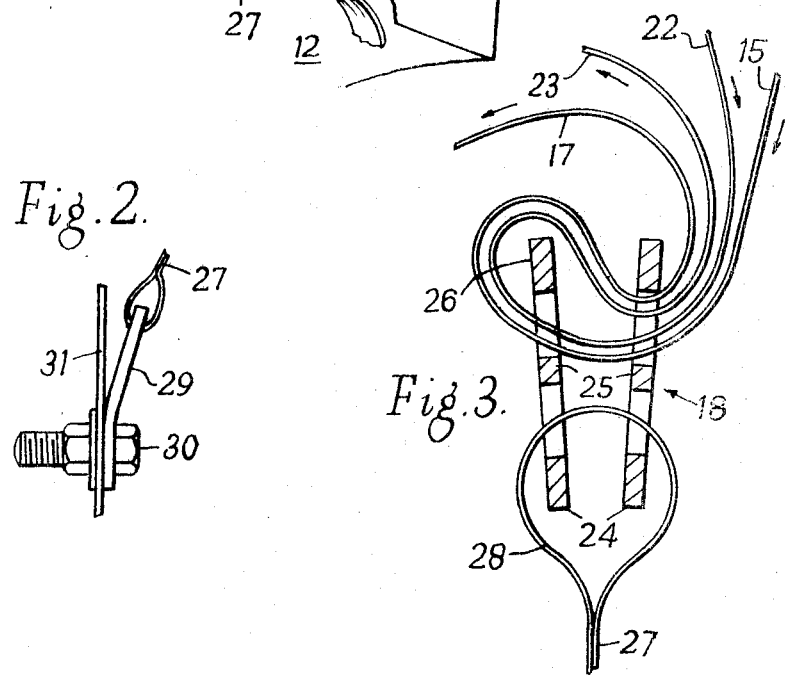

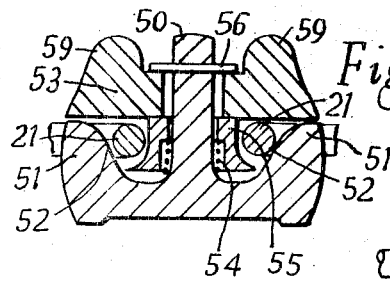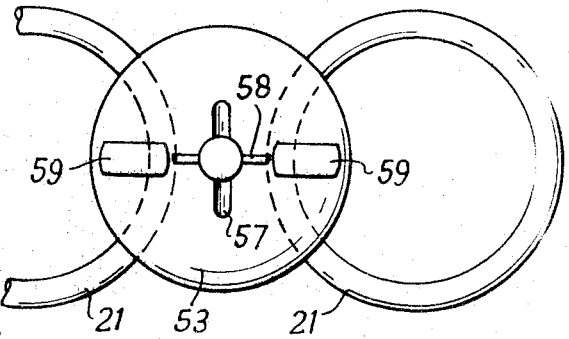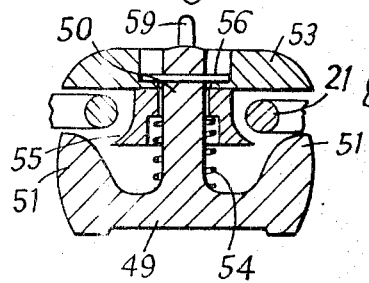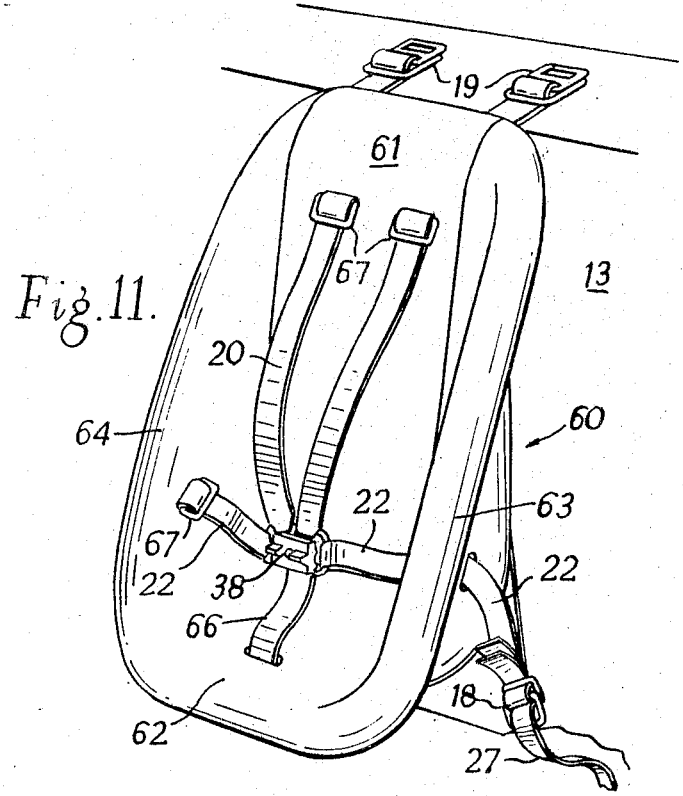

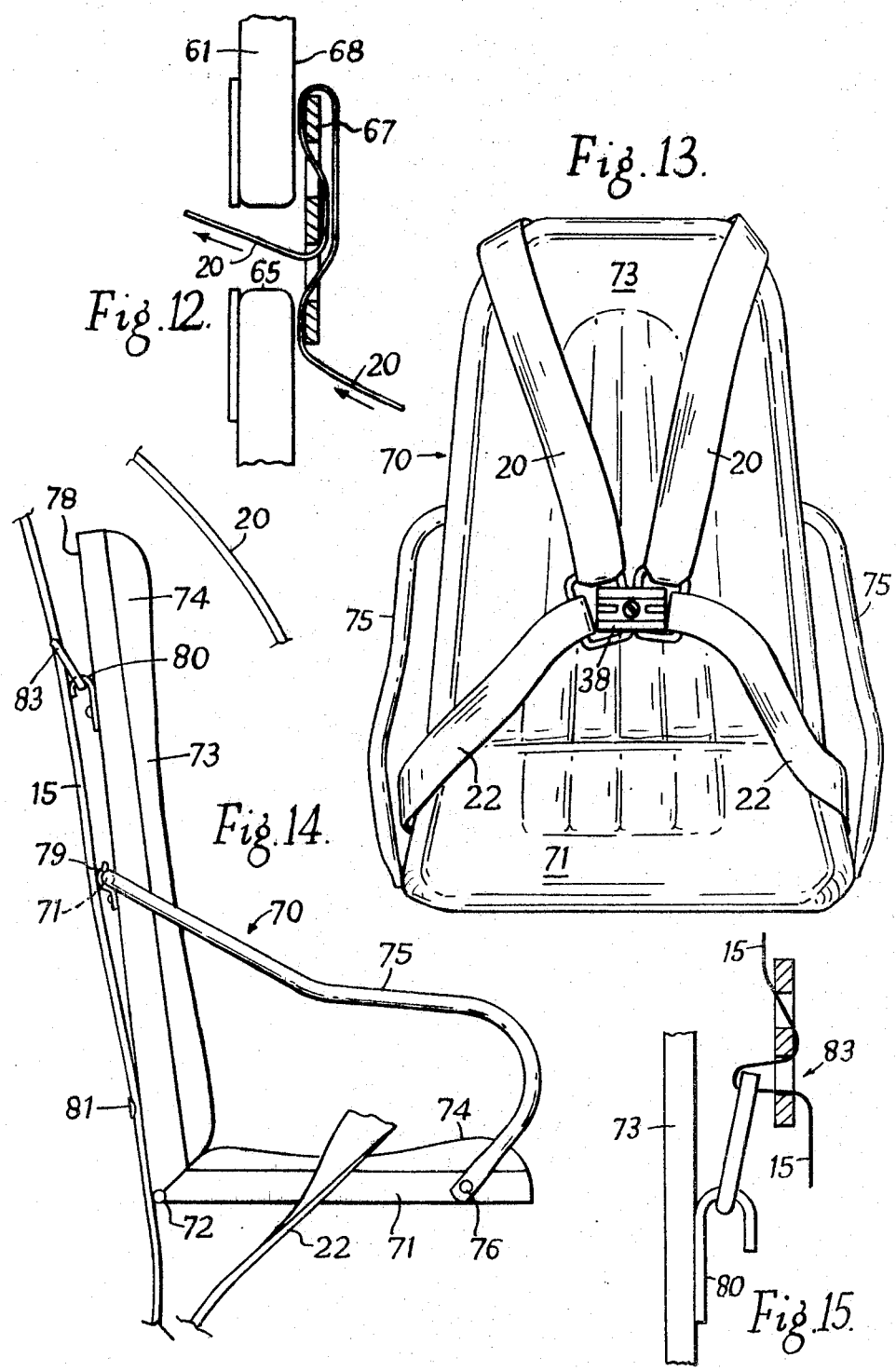

United States Patent Office 3,512,830
Patented May 19, 1970

3,512,830
SAFETY BELTS
Neville Marshall Norman, Ashford, and Derek Morley, Folkestone, Kent, England; said Norman assignor to Cleaver-Hume International Limited, London, England, a company of Great Britain
Filed Apr. 11, 1967, Ser. No. 630,022
Claims priority, application Great Britain, Apr. 15, 1966, 16,628/66; Aug. 23, 1966, 37,729/66; Oct. 28, 1966, 48,479/66
Int. Cl. A47c 1/08; A44b 21/00
U.S. Cl. 297—250      13 Claims

ABSTRACT OF THE DISCLOSURE

The invention provides a combination of a safety belt and child's seat in which the child's seat is restrained from forward movement independently of a child in the seat the safety belt having shoulder straps and lap straps which are anchored to the vehicle so that the belt can be used by an adult or older child when the child's seat is detached.

BACKGROUND OF THE INVENTION

This invention relates to safety belts for vehicles and to a combination of a safety belt and a child's seat. Prior art child's seats have either been secured by hooks over the vehicle seat back-rest, or if secured to a safety belt have lap straps extending from the child's seat around the child to restrain the child from forward movement.

SUMMARY OF THE INVENTION

It is an object of the invention to provide an improved combination of a safety belt and a child's seat in which the child's seat is restrained from forward movement independently of a child in the seat.

Accordingly in one aspect the invention provides:

In combination a safety belt for a vehicle having a seat with a back-rest and a child's seat, the belt having at least a pair of shoulder straps one end of each of which is arranged to be secured to a first anchor means for anchorage behind the seat back-rest and a pair of lap straps one end of each of which is arranged to be secured to a second anchor means for anchorage to the vehicle floor; clasp means for securing together the lap and shoulder straps in front of a wearer to restrain the wearer against forward movement, and securing means for detachably suspending the child's seat from the belt to restrain forward movement of the child's seat.

DRAWINGS

Embodiments of safety belt arrangements, in accordance with the invention will now be described, by way of example only, with reference to the accompanying drawings of which:

FIG. 1 is a view of a safety belt on the back seat of a vehicle,

FIG. 2 shows a bottom anchorage for the belt of FIG. 1,

FIG. 3 is a detailed view of one of the non slip buckles FIG. 1,

FIG. 8 is a sectional view through an alternative clasp in its locked position,

FIG. 9 is a sectional view through the clasp of FIG. 8 in its open position,

FIG. 10 is a plan view of the clasp of FIG. 8,

Figure 4:
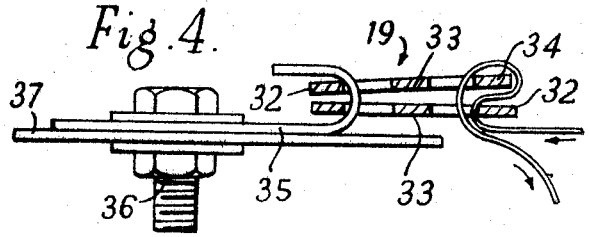
FIG. 4 shows a top anchorage for the belt of FIG. 1.

FIG. 11 is a front view of the belt of FIG. 1 in combination with one form of child's auxiliary seat, FIG. 12 is a sectional side view through part of the combination of FIG. 11, FIG. 13 is a front view of the belt of FIG. 1 in combination with a further form of child's auxiliary seat, FIG. 14 is a side view of the chair of FIG. 13, and FIG. 15 is a sectional view through part of the combination of FIG. 14.

DETAILED DESCRIPTION

Referring to FIGS. 1 to 4, the back seat of a car is shown having a seat portion 12 and a back rest 13. The safety belt comprises two straps 14 each consisting of a back part 15 and an integral front part 16. The back part has its lower end 17 passing through a non-slip adjustable buckle 18 anchored adjacent the bottom of the back rest 13, thereafter it extends up the back rest and passes through a sliding buckle 19 anchored adjacent the top of the back rest and becomes the front part. The front part comprises a shoulder portion 20 extending downwards from the sliding buckle and having its lower end secured to one edge of a rectangular clasp ring 21, and a lap portion 22 having one end secured to an adjacent edge of the clasp ring 21 and its other end 23 passing through the non-slip adjustable buckle 18. Each buckle 18 is formed from two rectangular rings 24 each having a strengthening centre bar 25. The ends 17, 23 of the strap are passed through both rings, round an outside edge 26 of one ring and back through the other ring as shown in FIG. 3; this provides a non-slip arrangement under strain but allows adjustment when the rings are held slightly apart. An anchor strap 27, one for each strap 14, is secured by a loop 28 to the rings 24, passes between the seat 12 and back rest 13 and at its lower end is firmly anchored by a bracket 29 and bolt 30 to a part 31 of the vehicle below the back seat.

Each sliding buckle 19 comprises a pair of rectangular rings 32 having centre bars 33, the strap passing through both rings, round the edge 34 of one ring and back through the other ring as shown in FIG. 4. This provides a non-slip arrangement under strain but allows the buckle to be slid along the strap when the rings are held slightly apart. The opposite edges of the ring 32 are hooked over a hook 35 anchored by a bolt 36 to a part 37 of the vehicle just behind the top of the seat back rest. The two clasp rings 21 are connected together in use by a clasp 38.

In operation, the shoulder portion of each strap is adjusted to the correct length for the clasp ring 21 to be at approximately the wearer's waist level with the shoulder portion extending over the wearer's shoulder by adjustment of the sliding buckle 19, the back part 15 is adjusted to bear against the seat back rest by adjusting the end 17 in the buckle 18 and the lap portion 22 is adjusted for length by adjusting the end 23 in the buckle 18. The safety belt is thus adjustable to suit wearers of different size, for example, from an average child of about five years of age to an adult. In addition the belt is such that upon impact of the vehicle causing a wearer to be thrown forward, the wearer is restrained by the front part of each strap and since the back part is exerting backward pressure on the seat back rest, this is also prevented from forward movement.

Figure 5:
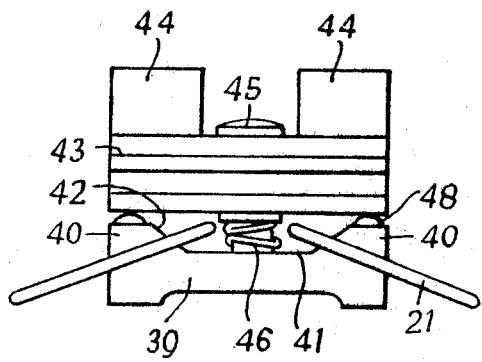
FIG. 5 is a detail side view of the clasp of FIG. 1 in its locked position.
Figure 6:
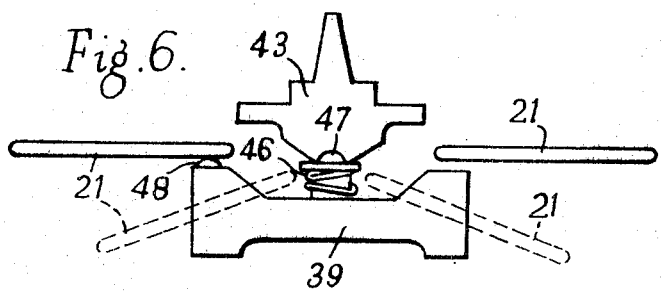
FIG. 6 is a detail side view of the clasp of FIG. 5 in its open position.
Figure 7:
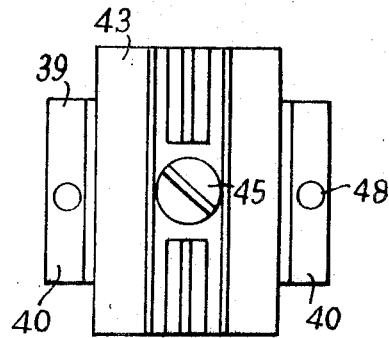
FIG. 7 is a plan view of the clasp of FIG. 6.

Referring next to FIG. 5, 6 and 7, the clasp 38 has a rectangular base 39 having upwardly extending ribs 40 at each end which are joined to a central surface 41 by inclined flats 42. The top of the clasp comprises a rectangular locking plate 43 formed with upwardly extending fingers 44 at each end and a bolt 45 passes through the top and is secured centrally of the base 39 so that the top is rotatable on the bolt and is urged away from the base by a spring 46. The top is formed on its lower surface with a longitudinal groove 47 to engage with balls 48 which are spring urged outwardly of the ribs of the base but held captive therein in known manner so as accurately to locate the base and top of the clasp in the closed position. When the locking plate is parallel to the base with the rings 21 embracing the ribs 40 respectively the clasp is locked since there is insufficient space between the ribs and locking plate for the ring to pass between them. When the locking plate is rotated through 90° from the locked position there is sufficient space between the ribs and locking plate for the rings to pass easily between them, and should the seat belt be under tension, so that the rings 21 tend to move apart, when the plate is rotated the engagement of the inner limb of each ring with the inclined flats 42 cause the rings to fly outwardly of the clasp.

An alternative clasp is shown in FIGS. 8, 9 and 10. This comprises a disc-like base member 49 having a central post 50 and a pair of diametrically opposed projections 51 on its upper surface joined to the upper surface by upwardly and outwardly inclined surfaces 52. A locking plate 53 is journalled on the post and a coil spring 54 with retaining cap 55 is interposed between the base member and the locking plate to urge these members apart. A transverse taper pin 56 extends through a hole at the top of the post to restrain the locking plate, and the top surface of the latter has a pair of angularly spaced grooves 57-58 of different depth radiating from its central bore, in which grooves the ends of the taper pin can be selectively accommodated by depression against the spring and rotation of the locking member. When the pin is in the deeper groove 57 the clasp is open and the rings 21 can be inserted on either side between the base member and locking plate to embrace the projections on the base member. When the locking member is then depressed and rotated to bring the pin into the shallower groove 58 the gap between the members is narrowed, and the diametrically opposed projections on the base member serve to retain the rings in the clasp. To release the rings, the locking member is again depressed and rotated to locate the taper pin in the deeper groove, and the inclined surfaces 52 guide the rings outwardly of the clasp. To this end the locking member may be provided with operating wings 59.

To prevent very small children from opening the clasp the spring strength may for example be up to about 20 lbs. The clasp may be made of metal or a plastics material.

It will be understood that although the safety belt described is suitable for use by fairly small children it cannot be satisfactorily used to restrain very small children and babies and for this purpose an auxiliary child's seat is provided. Referring to FIG. 11, this shows an auxiliary child's seat 60 suspended on the belt of FIGS. 1 to 4.

The seat 60 may be formed as a fibre pressing comprises a back 61, a seat 62 and two generally triangular side walls 63 and 64 the outer edges of the back seat and the side walls being formed with a rolled lip and the lip together with the interior of the seat being padded and covered with a suitable washable plastics material. The back of the seat is also formed with a laterally extending flat (not seen) projecting as a bulge beyond the side walls 63 and 64 to help in stabilizing the seat against a vehicle back rest.

The back 61 of the seat is formed towards its upper end with a pair of transversely extending spaced apart slots 65 through which the portions 20 of the belt are respectively threaded. The side walls 63 and 64 are formed with inclined slots through which the portions 22 are respectively threaded and the clasp 38 is carried at one end of an anchored leg strip 66 passing through a slot centrally of the front of the seat 62.

Inwardly of the seat 60 the strap parts 20 and 22 carry buckles 67 to prevent forward movement of the seat relative to these straps. In FIG. 12 part of the back 61 of the seat is shown with a slot 65 and a buckle 67 comprising a three-limb buckle through which the strap part 20 is threaded as indicated so that the buckle and strap passing around it lie flat against the inner surface 68 of the seat back. It will be understood that this particular arrangement permits adjustment of the buckles 67 to vary the lengths of the strap parts 20, 22, in front of the seats for different children to be accommodated within the seat but once the position shown in FIG. 12 is adopted the strap cannot pull through the buckle 67 and although the seat is merely suspended on the strap parts and is not secured thereto it cannot move forwardly of the strap parts beyond the position set by the buckles 67.

Still referring to FIG. 12, after the strap part 20 passes through the slot 65 it is threaded as indicated through the slipping buckle 19 as before.

The leg strap 66 serves not only as a retaining member for the clasp 38 but also provides a useful locating means for a baby's legs.

It will thus be understood that the present invention provides the combination of a safety belt with an auxiliary child's seat the latter being loosely located on the belt although restrained from forward movement relative thereto. In use therefore no reliance whatsoever is placed upon the strength of the seat structure in restraining a child secured therein, the seat merely serving as a convenient means of accurately locating the safety belt on a small child or baby. Under impact both the seat and the child will be separately restrained by the belt so that the seat could, if desired, be a lightweight shell of low inherent strength.

The seat described with reference to FIG. 11 tends to be expensive to produce and furthermore, while it can readily be removed from engagement with the safety harness so that the latter may be used for an older child or an adult such removal entails disconnection of a number of the straps of the safety belt and subsequent re-adjustment of the harness to fit the person concerned.

In the alternative seats shown in FIGS. 13 and 14, the seat 70 comprises a sitting platform 71 hinged as indicated diagrammatically at 72 with a back rest 73, the platform and the back rest both being suitably upholstered as at 74 and covered with decorative and waterproof plastics material. The seat has a pair of tubular metal arm rests indicated at 75, the lower end one of which is shown pivoted at 76 to the associated side edge of the sitting platform 71. The upper end of each arm rest passes alongside the associated side edge of the back rest 73 and is bent to constitute a bridging bar 77 extending across the rear surface of the back rest and being bent at its other end (not shown) to merge into the upper end of the other arm the lower end of which is similarly pivoted to the other side edge of the sitting platform 71. In its operative position, the bridging bar 77 is engaged by clips secured to the rear surface 78 of the back rest, one such clip being shown at 79, and it will be understood that by disengagement of the bridging bar 7 from these clips arm rests may be jointly pivoted and the seat folded about the hinge 72 until the back rest and the sitting platform 71 are aligned for storage purposes. Towards its upper end the rear surface 78 of the back rest is provided with a pair of transversely spaced hooks one of which is shown at 80 and towards its lower end the rear surface has a pair of transversely spaced clips one of which is shown at 81.

The auxiliary child's seat 70 is intended to be supported by the back portions 15 of the safety belt closely embracing the back rest of the rear seat of a vehicle. For this purpose this strap part at a position a part way down the seat back rest carried a buckle indicated at 83, to be engaged by the hook 80. Towards the lower end of the seat back rest the strap part 15 is engaged by the clip 81 and it will be understood that the other similar strap part 15 embracing the seat back rest is similarly engaged by the other one of the hooks such as 80 and clips such as 81 to suspend the auxiliary child's seat on these strap parts. The buckle 83 is shown in detail in FIG. 15 and comprises a three-limbed buckle 83A and a D-shaped buckle 83B in which the hook 80 is engaged. The strap part 15 extends in front of the upper limb of the buckle 83A, behind the middle limb through the D-shaped buckle in front of buckle 83A and behind the lower limb of that buckle.

The harness parts 20 are indicated passing over the top of the back rest 73 of the auxiliary seat and the parts 22 passing through the space between the sitting platform 71 and the arm rests 75. It will here be understood that for this purpose the non-slip buckles 18 must be disengaged. Alternatively, if the arm rests such as 75 were not joined by the bridging bar 77 it will be appreciated that no such disengagement of these non-slip buckles would be necessary.

In operation a child may be supported in the seat rest by the safety harness and in the event of a collision causing the child to be thrown forwards the safety belt parts such as 15 around the vehicle back rest will restrain forward movement of the auxiliary child's seat.

Although as described above the auxiliary child's seat is particularly suitable for use with the seat belt described it will be understood that it could equally well be used with any seat belt having a strap part or parts suitably engaging over the rear seat back rest of a vehicle. In addition the auxiliary seat shown in FIGS. 11 and 12 could be suspended on the strap or straps of a belt other than that described.

In addition the buckles 19 need not be anchored to a part of the vehicle structure at the top of the seat back rest but may be secured to further anchor straps anchored adjacent the floor of the vehicle.

I claim:
1. In combination a safety belt for a vehicle having a seat with a back-rest and a child's seat, the belt having at least a pair of shoulder straps one end of each of which is arranged to be secured to a first anchor means for anchorage behind the seat back-rest and a pair of lap straps one end of each of which is arranged to be secured to a second anchor means for anchorage to the vehicle floor; clasp means for securing together the lap and shoulder straps in front of a wearer to restrain the wearer against forward movement, and securing means for detachably suspending the child's seat from the belt to restrain forward movement of the child's seat, said child's seat being adapted to be detached, and the remaining elements of said combination serving to hold an adult.

2. The combination according to claim 1 in which the shoulder straps extend through slots in the back of the seat and the securing means includes nonslip buckles on the belt immediately in front of the slots to engage the seat back and restrain the seat from forward movement.

3. The combination according to claim 2 in which the lap straps extend through slots in the sides of the seat, and the securing means includes nonslip buckles on the lap straps to engage the seat sides and restrain the seat from forward movement.

4. The combination according to claim 1 in which each lap strap is connected to its associated shoulder strap by a clasp ring.

5. The combination according to claim 4 in which the clasp means is arranged to connect together the clasp rings.

6. The combination according to claim 1 in which the clasp means is secured to a leg strap attached to the vehicle floor below the vehicle seat.

7. The combination according to claim 5 in which the clasp means comprises a base member having a pair of projections at opposite sides extending from its upper surface, and a locking member mounted on a post on the base member for rotation between the locked position in which the clasp rings cannot be moved between the projections and the locking member, and an open position in which there is a sufficient gap between the projection and the locking member to allow easy movement of the clasp rings therebetween, and in which the projections are joined to the upper surface of the base member by upwardly and outwardly inclined surfaces.

8. The combination according to claim 1 in which the belt has a back part contacting the vehicle seat back rest and anchored to the vehicle by the first and second anchorage means and in which the seat includes means for engagement with the back part to restrain the seat from forward movement while the shoulder and lap straps extend in front of the seat to restrain the child in the seat.

9. The combination according to claim 8 including a hook on the seat and arranged to be supported from the back strap part of the belt.

10. The combination according to claim 9 in which the back part carries a buckle for engagement by the hook.

11. The combination according to claim 9 in which the seat comprises a seat portion and a back rest portion hinged to the back of the seat portion, and arm portions hinged adjacent to the front of the seat portion and arranged to engage the back rest portion.

12. The combination according to claim 1 in which the belt has a pair of back-straps arranged to bear against the vehicle seat back-rest to restrain forward movement of that back-rest, the back-straps being anchored to the vehicle by the same anchor means as the shoulder and lap straps.

13. The combination according to claim 12 in which each associated shoulder strap and back-strap are formed as a continuous strap passing through a non-slip buckle adjacent the top of the vehicle seat back-rest, the buckle being attached to the first anchor means.

References Cited

UNITED STATES PATENTS

| | | | |
|---|---|---|---|
| 1,429,867 | 9/1922 | Goldsmith | 297—250 |
| 1,899,656 | 2/1933 | Wigley et al. | 244—151 |
| 2,480,402 | 8/1949 | Elston | 297—252 X |
| 2,556,741 | 6/1951 | Reyburn. | |
| 2,664,140 | 12/1953 | Kindelburger | 297—250 X |
| 2,736,364 | 2/1956 | Janus | 297—250 |
| 2,955,296 | 10/1960 | Zapolski | 297—250 |
| 3,136,579 | 6/1964 | Hunter | 297—250 |
| 3,149,807 | 9/1964 | Jungersen et al. | 244—151 |
| 3,207,552 | 9/1965 | Loughney | 297—250 |
| 3,325,213 | 6/1967 | Levy | 297—250 |
| 2,365,625 | 12/1944 | Carlisle | 297—385 |
| 3,158,399 | 11/1964 | Pragnell | 297—389 |

JAMES T. McCALL, Primary Examiner

U.S. Cl. X.R.

24—73; 297—385